Figure 3:
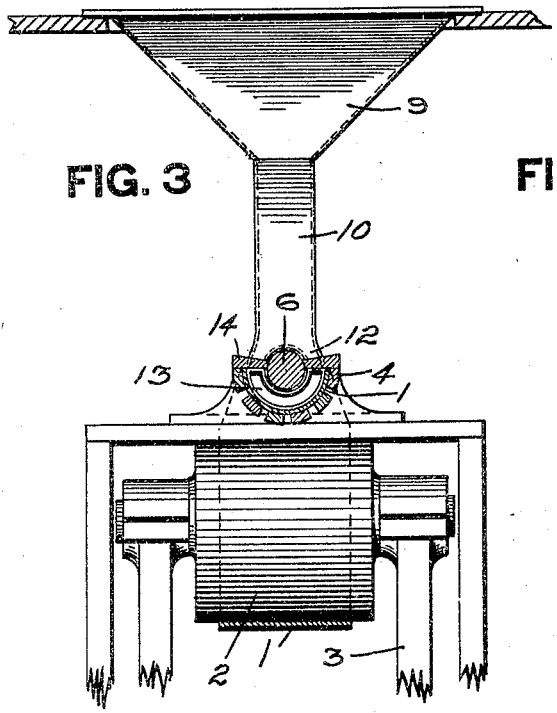

No. 775,542. PATENTED NOV. 22, 1904.
J. A. McCONNELL.
APPARATUS FOR MOLDING PLASTIC MATERIALS.
APPLICATION FILED FEB. 23, 1904.
NO MODEL. 2 SHEETS—SHEET 1.
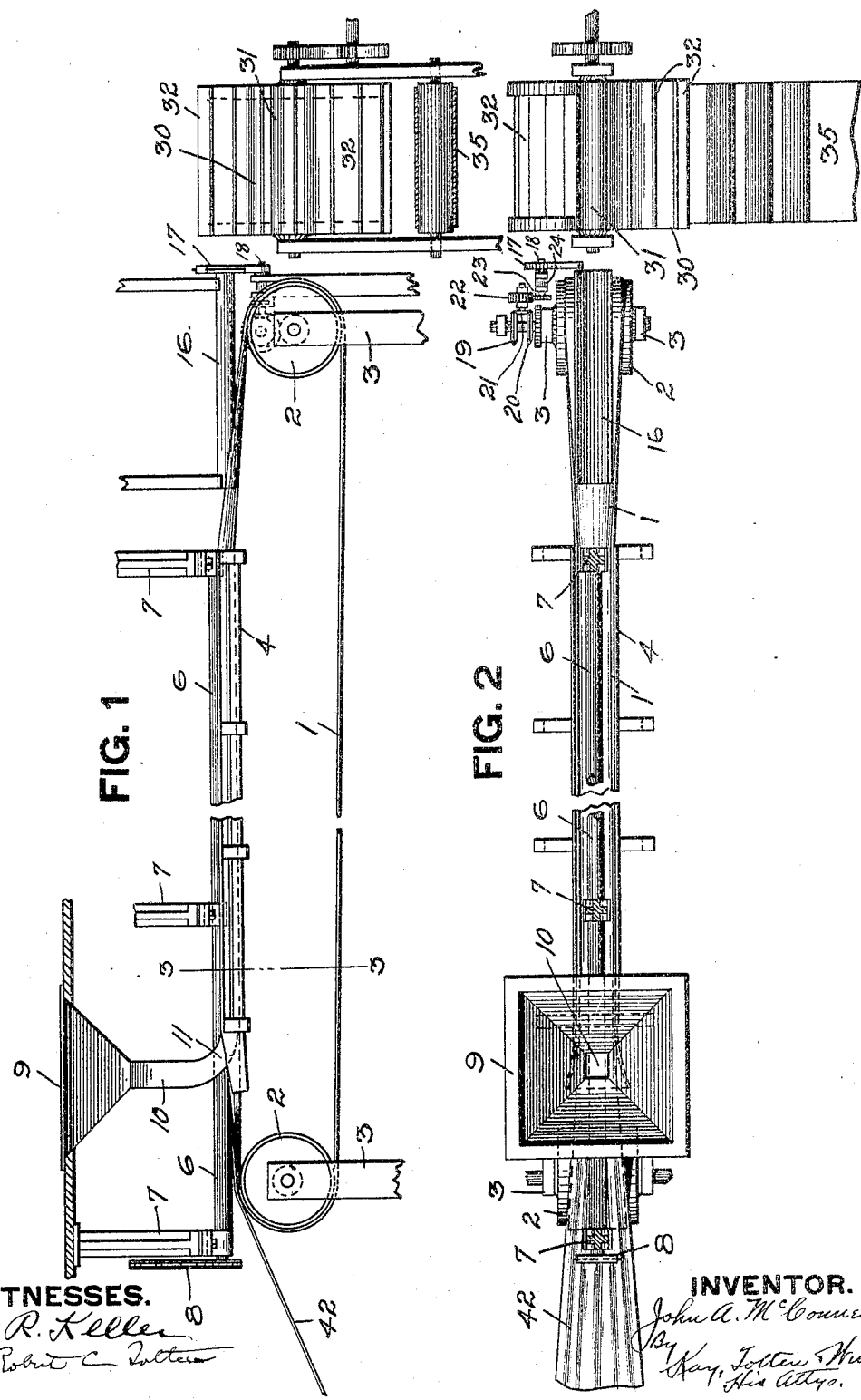
WITNESSES.
INVENTOR.
John A. McConnell
By Kay, Totten & Winter,
His Attys.

No. 775,542. PATENTED NOV. 22, 1904.
J. A. McCONNELL.
APPARATUS FOR MOLDING PLASTIC MATERIALS.
APPLICATION FILED FEB. 23, 1904.
NO MODEL. 2 SHEETS—SHEET 2.

WITNESSES.
G. R. Keller
Robert C. Totten

INVENTOR.
John A. McConnell,
By Kay, Totten & Winter,
his Attys.

No. 775,542. Patented November 22, 1904.

UNITED STATES PATENT OFFICE.

JOHN A. McCONNELL, OF ALLEGHENY, PENNSYLVANIA.

APPARATUS FOR MOLDING PLASTIC MATERIALS.

SPECIFICATION forming part of Letters Patent No. 775,542, dated November 22, 1904.

Original application filed May 7, 1902, Serial No. 106,279. Divided and this application filed February 23, 1904. Serial No. 194,810.

(No model.)

*To all whom it may concern:*

Be it known that I, JOHN A. MCCONNELL, a resident of Allegheny, in the county of Allegheny and State of Pennsylvania, have invented a new and useful Improvement in Apparatus for Molding Plastic Materials; and I do hereby declare the following to be a full, clear, and exact description thereof.

My invention relates to apparatus for molding semitubular non-conducting coverings from materials which set by adding water to them—such as plaster-of-paris, calcined magnesia, or cement, or mixtures of such materials with other suitable materials, and preferably having asbestos, hair, or other suitable fiber mixed therewith.

The object of my invention is to provide apparatus for this purpose which is adapted to mold such materials in a substantially continuous manner.

In molding tubular or semitubular non-conducting coverings the practice which has most generally been followed heretofore has been to add enough water to the materials and agitate the same until a semiliquid mass was formed, which was then poured into tubular or semitubular molds with a core in the center and there allowed to set, after which the molded tube or half-tube and core were removed from the mold. Two forms of molds have generally been used, one being semitubular or trough-shaped and used in a horizontal position and the other being tubular and used in an upright position. The former molded a half-tubular section and the latter a tubular section. The tubular section was afterward cut longitudinally into half-tubes, so that it could be readily placed around a pipe or other cylindrical body. The customary length of these molds is three feet. Hence each semitubular mold would make the equivalent of eighteen inches of tubular covering at each filling, and the tubular upright molds would make three feet. The practice has been to pour the semiliquid mass into the molds by hand from buckets, so that it was a slow hand process, and the subsequent opening of the molds and removing the cores and molded sections therefrom by hand, cutting open longitudinally, and the squaring the ends of the tubular sections or matching the edges and ends of the semitubular sections makes either of the customary operations slow and tedious. Furthermore, the sections being only three feet long necessitates frequent joints at which heat can escape and cold enter, besides marring the appearance of the covering when in place.

The present application is a division of my application, Serial No. 106,279, filed May 7, 1902, and has for its object to specifically claim certain modifications of molding devices, cutter, and delivery mechanism shown and described in said application.

Figure 4:
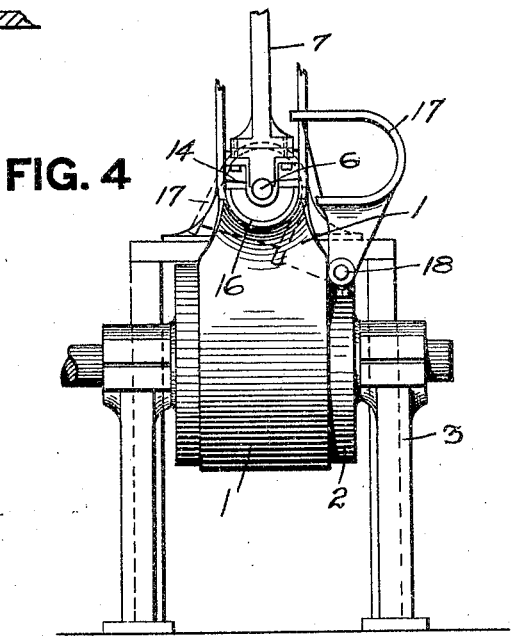
Figure 5:
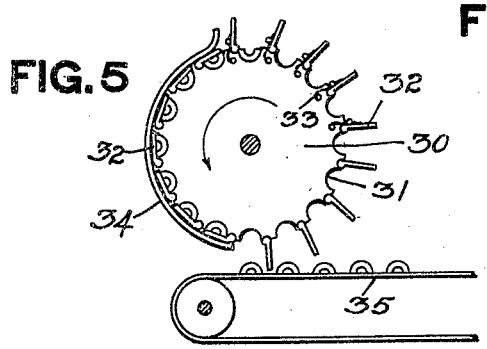
Figure 6:
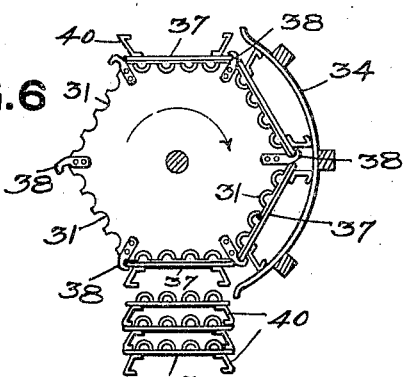
Figure 8:
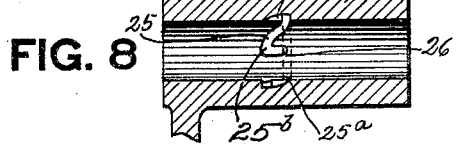
Figure 7:
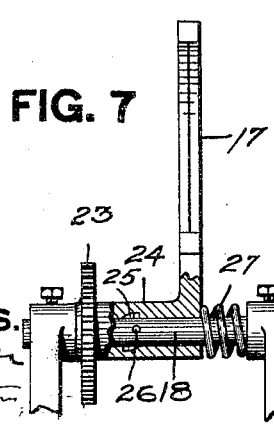
Figure 9:
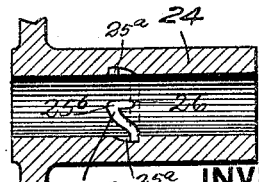

In the accompanying drawings, Figure 1 is a side view of my apparatus. Fig. 2 is a plan view of the same. Fig. 3 is a cross-section on the line 3 3, Fig. 1. Fig. 4 is a rear end view of the molding and cutting portion of the apparatus. Fig. 5 is an end view of the delivery mechanism. Fig. 6 is a similar view of a modification; and Figs. 7, 8, and 9 are detail views of the cutting means.

The essential feature of my invention is an endless traveling mold of semitubular form together with a core coöperating therewith. These parts may take various forms without departing from the spirit of my invention. Preferably the mold will be an endless belt 1, traveling over power-driven drums or pulleys 2, mounted in suitable frames 3. This belt will preferably be made of rubber or other material, which is not readily affected by the moisture, and means will be provided for holding the upper reach thereof in trough or semitubular shape. Preferably this will be done by placing beneath the upper reach of the belt a semitubular trough 4, which in the specific modification shown and claimed in this divisional application is stationary, and the belt 1 slides through the same and is held thereby in trough form. The trough 4 preferably is formed either of separate longitudinal slats, as shown in Fig. 3, or of perforated metal, so as to admit air underneath the belt 1 and overcome the suction or friction of the rubber belt on said trough.

A suitable mandrel or core must be used in connection with the mold, and this likewise may be of various forms and in the specific modification shown and claimed in this application. Said core comprises a cylindrical bar 6, which is rotatably mounted in the lower ends of hangers 7 and rotated by any suitable mechanism, such as the sprocket-wheel and chain 8. The rotation of the mandrel prevents the plastic material from sticking thereto.

The semiliquid mass of material may be fed to the mold in any suitable way, either being poured by hand therein, but preferably being delivered to a hopper 9, from which a spout 10 leads downwardly to the belt 1 and has a curved end 11, so as to deliver the material onto the belt after the same has been formed into trough shape. Inasmuch as the mandrel-bar projects beyond the spout 10 the latter must be so shaped as to permit the passage of the core-bar. This is accomplished, as shown in Fig. 3, by widening out the lower end of the spout, as indicated at 12, and providing in said widened portion an opening 13, which is surrounded by a suitable bushing, through which the core-bar passes.

It is desirable to close the upper side of the mold, so as to prevent the material spilling out and to shape the edges of the semitubular sections. I have provided for this purpose cover-plates 14, which may be supported in any suitable way, but which for this modification can conveniently be secured to the stationary frame or to the sides of the stationary trough 4 and which have their inner edges lying in close contact with the rotating core-bar. These cover-plates preferably are thicker at their outer edges or have the outer edges turned up, so that any semifluid material which may leak out around the core-bar will drain back into the mold.

At the delivery end of the mold I provide a suitable stationary trough 16, lying above the belt 1 and supported from the frame above, through which trough the semitubular molded sections will be shoved by the forward travel of the endless mold. The article comes from the mold continuously as long as material is supplied to the mold. It will be necessary to divide this article into sections, and this can conveniently be done at the end of the trough 16 either by means of a hand saw or knife, but preferably by means of power-actuated cutting mechanism, which is caused to traverse the path of movement of the article and sever the same. If the mold is traveling continuously, the cutting device is made to travel forward at the same rate as the mold while traversing the path of the molded article. The cutting mechanism may comprise either a saw mounted in a swinging or moving frame or a knife or wire. I have shown the latter as a convenient means for accomplishing this purpose. The mold will be of such length, relatively very much longer than shown in the drawings, as to enable the semiliquid mass to set by the time it leaves the mold; but the article will still be sufficiently soft, so that a cutting-wire will sever the same. This cutting-wire is shown attached to a U-shaped frame 17, which is mounted on a shaft 18, so that it can be rocked to carry the cutter across the path of the article and move along with the same. Any suitable mechanism for this purpose may be employed. I have shown a pair of beveled gears 19 and 20 on the drum-shaft 2, which gears are mutilated and oppositely arranged and mesh with a bevel-pinion 21, to which is connected a long gear 22, which in turn meshes with a gear 23, secured to the sleeve 24, to which the cutter-frame 17 is attached. The oppositely-arranged mutilated gears are driven at such a rate that they will rock the frame 17 at predetermined lengths of article—say at every six feet of the travel of the continuous mold—and as they are oppositely arranged the cutter will be caused to sever the article in both directions of its movement, so as to cut off sections—say three feet long. The sleeve 24 is slidably mounted on the shaft 18 and is provided with a pair of oppositely-arranged cam-grooves 25, which are engaged by a pin 26, slidably fitting in an opening in the shaft, and which will move the sleeve longitudinally, so that the cutter will travel with the article when severing it, so as to cut the same at right angles. The ends of the cam-grooves 25 are beveled, as indicated at $25^a$, Figs. 8 and 9, so that when the sleeve reaches the limit of its oscillation in one direction the pin will be pushed through the shaft, so as to become disengaged from that cam-groove and have its opposite end projected into the straight portion $25^b$ of the other cam-groove, thus permitting the spring 27 to move the sleeve longitudinally on the shaft. A spring 27 returns the sleeve and cutter to its original position after each severing of the article.

Adjacent to the delivery end of the trough 16 I provide suitable mechanism for receiving the cut-off sections and conveying them away. This mechanism may also be of various forms, and in the specific modification shown and claimed in this application this delivery mechanism is of the rotary type and comprises a rotating drum or the like 30, provided with concave depressions 31 on its periphery for receiving the semitubular sections as they are delivered from the mold. Adjacent to each of the depressions 31 is hinged a cover 32, which has connected thereto a spring 33 for holding the same normally extended. One side of this drum is inclosed by the guide or shield 34, which will cause the covers 32 to close over the sections held in the depressions 31, as shown in Fig. 5, in which position the parts are held until the end of said guide is cleared, when the covers 32 will swing outward by gravity or by the force of the springs 33, thus permitting the molded section to drop down upon a suitable table or belt 35, by which it is conveyed away.

In case a plurality of molding devices are placed side by side, as described in the parent application, the delivery mechanism will be modified substantially as shown in Fig. 6— that is, instead of being circular it will be polygonal in outline and each face thereof will be provided with a series of depressions 31, corresponding in number to the number of molding apparatus employed, four being shown in Fig. 6. In that case as soon as one of the faces of said drum is filled with molded sections I place over the same a shelf 37, which will have one edge held under the clip 38, secured to the drum, while the opposite edge of the shelf will be free. The drum rotates in the direction shown by the arrow, and the guide 34 holds the shelves and sections in place. The forward end of the shelf is the one that is held by the clip 38, so that when said forward end passes the end of the guide 34 it cannot immediately drop; but the rear end of the shelf is not held by any clip, and as soon as it passes the end of the guide 34 it will drop, thus permitting the other end to fall out of the clip 38. The shelves will be deposited upon a suitable truck or other means, and preferably I provide each of the shelves with legs 40, so that one shelf will be held above the preceding one. These shelves or the truck bearing them will preferably be on a platform or elevator, which will gradually be lowered as the shelves thereon accumulate, and a series of shelves may be removed on a truck, as described in the parent application.

If it is desired to sheathe the molded sections with cloth or paper, a strip of sheathing material 42 will be drawn from any suitable roll or spool and introduced in the mold and will travel along with the latter, and thus become embedded in the outer surface of the molded sections. This sheathing material will be of the proper width to cover the outer surface of the molded section and may, if desired, be longitudinally fluted or corrugated, as shown in Fig. 2. To further cause this sheet to adhere to the section, it may, if desired, be coated with an adhesive substance. It preferably will be introduced at the front end of the mold, as shown in the drawings, although it may also be introduced at the rear end, as shown in the parent application. This lining-strip may even take the place of the belt 1, thus permitting the latter to be dispensed with.

In the operation of the apparatus the endless traveling mold receives the semiliquid mass from the hopper 9, and said mass is shaped in the traveling mold by the rotary core-bar 10 and cover-plates 14. During the travel of the mold the semiliquid mass is held in shape and gradually sets, and by the time it reaches the end of the mold it has set sufficiently to maintain its shape. Here it is cut into sections by the mechanism described and then shoved onto the rotary drum, whereby it is delivered to the traveling belt or table 35 and carried away.

By means of this apparatus semitubular coverings will be formed in a practically continuous manner, as the molds can be driven either continuously or in a rapidly-intermittent manner. In either event almost an unlimited quantity of semitubular sections can be formed and with a minimum amount of labor, thus overcoming the slow, tedious, wasteful, and expensive hand processes heretofore used.

What I claim is—

1. In a machine for molding semitubular non-heat-conducting coverings from materials which set by the addition of water thereto, the combination of an endless mold having a long trough-like portion with the open side directed upwardly and arranged to travel horizontally, means for moving the same, and a non-traveling core arranged in said trough-like mold.

2. In a machine for molding semitubular non-heat-conducting coverings from materials which set by the addition of water thereto, the combination of an endless mold having a long trough-like portion with the open side directed upwardly and arranged to travel horizontally, means for moving the same, a cylindrical core arranged in said trough-like mold, and means for rotating said core.

3. In a machine for molding semitubular non-heat-conducting coverings from materials which set by the addition of water thereto, the combination of an endless mold having a long trough-like portion with the open side directed upwardly and arranged to travel horizontally, means for moving the same, a cylindrical core arranged in said trough-like mold, means for rotating said core, and a spout having a curved lower end lying in said mold for delivering the material thereto.

4. In a machine for molding semitubular non-heat-conducting coverings from materials which set by the addition of water thereto, the combination of an endless mold having a long trough-like portion with the open side directed upwardly and arranged to travel horizontally, means for moving the same, a core arranged in said trough-like mold, means for rotating said core, and a spout for delivering the material into said mold, said spout being provided with an opening through which said core passes.

5. In a machine for molding semitubular non-heat-conducting coverings from materials which set by the addition of water thereto, the combination of an endless traveling belt, means for moving the same, means for holding the same in trough form during a portion of its course, and a non-traveling core supported at or near both ends and arranged in the trough portion of said belt.

6. In a machine for molding semitubular non-heat-conducting coverings from materials which set by the addition of water thereto, the combination of an endless traveling belt, means for moving the same, a stationary trough for holding the upper reach of said belt in trough form, and a core supported at or near both ends and arranged above the upper reach of said belt and in the trough-like portion thereof.

7. In a machine for molding semitubular non-heat-conducting coverings from materials which set by the addition of water thereto, the combination of an endless traveling belt, a perforated stationary trough for supporting the upper reach thereof and holding the same in trough form, and a core coöperating with the trough portion of said belt.

8. In a machine for molding semitubular non-heat-conducting coverings from materials which set by the addition of water thereto, the combination of an endless traveling belt, a stationary trough provided with longitudinal slots and arranged to support the upper reach of said belt and hold the same in trough form, and a core coöperating with the trough portion of said belt.

9. In a machine for molding semitubular non-heat-conducting coverings from materials which set by the addition of water thereto, the combination of an endless mold having a long trough-like portion with the open side directed upwardly and arranged to travel horizontally, means for moving the same, a rotary cylindrical core coöperating with said mold, and stationary cover-plates covering said mold and projecting into close contact with said core.

10. In a machine for molding semitubular non-heat-conducting coverings from materials which set by the addition of water thereto, the combination of an endless mold having a long trough-like portion with the open side directed upwardly and arranged to travel horizontally, means for moving the same, a cylindrical rotating core arranged in said mold, and cover-plates for confining the material in said mold and shaping the edges of the article, said cover-plates having raised outer edges to direct the leakage back into the mold.

11. In a machine for molding semitubular non-heat-conducting coverings from materials which set by the addition of water thereto, the combination of a stationary trough, a core located thereabove and supported at or near both ends and arranged therein, and means for drawing a fabric through said trough and underneath said core.

12. In a machine for molding semitubular non-heat-conducting coverings from materials which set by the addition of water thereto, the combination of a stationary trough, a cylindrical rotating core located thereabove and arranged therein, means for rotating said core, and means for drawing a fabric through said trough and underneath said core.

13. In a machine for molding semitubular non-heat-conducting coverings from materials which set by the addition of water thereto, the combination of an endless mold having a long trough-like portion with the open side directed upwardly and arranged to travel horizontally, means for moving the same, a core arranged in the trough-like portion of said mold, and mechanism at the delivery end of said mold for cutting the article into sections.

14. In a machine for molding semitubular non-heat-conducting coverings from materials which set by the addition of water thereto, the combination of an endless mold having a long trough-like portion with the open side directed upwardly and arranged to travel horizontally, a core arranged in the trough-like portion of said mold, a cutter at the delivery end of said mold, and mechanism for moving said cutter across and longitudinally with the article emerging from said mold.

15. In a machine for molding semitubular non-heat-conducting coverings from materials which set by the addition of water thereto, the combination of an endless mold having a long trough-like portion with the open side directed upwardly and arranged to travel horizontally, a core arranged in the horizontal portion of said mold, cutting mechanism at the delivery end of said mold, and mechanism for moving said cutter across the path of the article to sever the same in both directions of its movement.

16. In a machine for molding semitubular non-heat-conducting coverings from materials which set by the addition of water thereto, the combination with an endless mold having a long trough-like portion with the open side directed upwardly and arranged to travel horizontally, a core arranged in the horizontal portion of said mold, a rocking frame at the delivery end of said mold, a cutting-blade carried by said frame, and mechanism for rocking said frame to cause the blade to sever the article.

17. In a machine for molding semitubular non-heat-conducting coverings from materials which set by the addition of water thereto, the combination of an endless traveling mold, a core coöperating therewith, means for forming the articles in sections, and a rotary delivery-rack for receiving the sections from said mold.

18. In a machine for molding semitubular non-heat-conducting coverings from materials which set by the addition of water thereto, the combination of an endless traveling mold, a core coöperating therewith, means for dividing the article into sections, a rotary delivery-rack for receiving the sections, and a traveling belt or table for receiving the article from said delivery-rack.

19. In a machine for molding semitubular non-heat-conducting coverings from materials which set by the addition of water thereto, the combination of an endless traveling mold, a core coöperating therewith, means for dividing the article into sections, a rotary delivery-rack provided with peripheral grooves for receiving the sections, and covers arranged to confine said sections during the partial rotation of said rack.

20. In a machine for molding semitubular non-heat-conducting coverings from materials which set by the addition of water thereto, the combination of an endless traveling mold, a core coöperating therewith, means for dividing the article into sections, a rotary delivery-rack provided with peripheral grooves for receiving the sections, and a stationary segment arranged to confine said sections in the grooves during a partial rotation of said rack.

21. In a machine for molding semitubular non-heat-conducting coverings from materials which set by the addition of water thereto, the combination of an endless traveling mold, a core coöperating therewith, means for dividing the article into sections, a rotary rack provided with peripheral grooves for receiving the sections, covers arranged to confine said sections in said grooves, and a stationary segment for holding said covers down during a partial rotation of said rack.

22. In a machine for molding semitubular non-heat-conducting coverings from materials which set by the addition of water thereto, the combination of an endless traveling mold, a core coöperating therewith, means for dividing the article into sections, a rotary rack provided with peripheral grooves for receiving the sections, hinged covers coöperating with said grooves, springs for holding said covers normally open, and a stationary segment arranged to hold said covers closed during a partial rotation of said rack.

23. In a machine for molding semitubular non-heat-conducting coverings from materials which set by the addition of water thereto, the combination of an endless traveling mold, a core coöperating therewith, means for dividing the article into sections, a rotary delivery-rack provided with peripheral grooves for receiving the sections, hinged covers coöperating with said grooves, springs for holding said covers normally open, and a stationary segment arranged to hold said covers closed during a partial rotation of said rack.

24. In a machine for molding semitubular non-heat-conducting coverings from materials which set by the addition of water thereto, the combination of an endless traveling mold, a core coöperating therewith, means for dividing the article into sections, a rotary delivery-rack provided with peripheral grooves for receiving the sections, covers arranged to confine said sections during a partial rotation of said rack, and a traveling belt or table for receiving the sections from said rack.

25. In a machine for molding semitubular non-heat-conducting coverings from materials which set by the addition of water thereto, the combination of an endless traveling mold, a core coöperating therewith, means for dividing the article into sections, a rotary delivery-rack provided with peripheral grooves for receiving the sections, a stationary segment for confining the sections in said grooves during a partial rotation of said rack, and a traveling table or belt for receiving the sections from said rack.

In testimony whereof I, the said JOHN A. McCONNELL, have hereunto set my hand.

JOHN A. McCONNELL.

Witnesses:
ROBERT C. TOTTEN,
G. KREMER.